Figure 1:
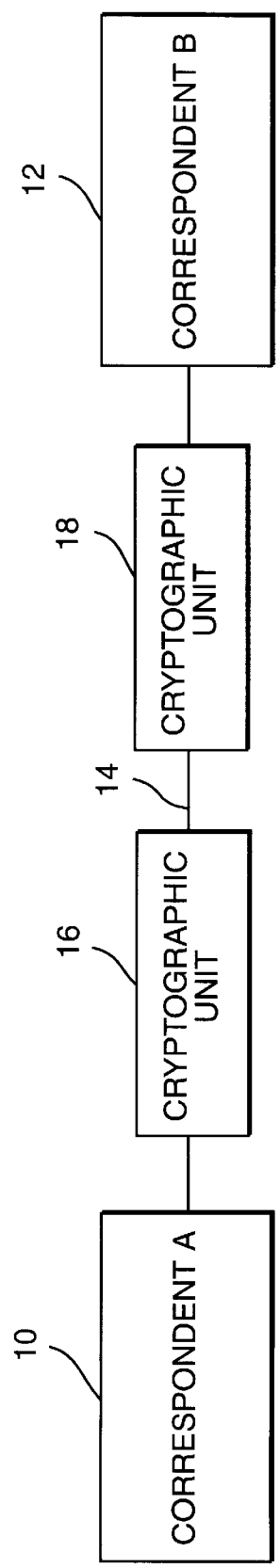

United States Patent [19]
Vanstone et al.

[11] Patent Number: 6,097,813
[45] Date of Patent: Aug. 1, 2000

[54] DIGITAL SIGNATURE PROTOCOL WITH REDUCED BANDWIDTH

[75] Inventors: Scott A. Vanstone; Minghua Qu, both of Ontario, Canada

[73] Assignee: Certicom Corp., Mississauga, Canada

[21] Appl. No.: 08/856,591

[22] Filed: May 15, 1997

[30] Foreign Application Priority Data

May 15, 1996 [GB] United Kingdom .................... 9610154

[51] Int. Cl.$^7$ ........................................ H04L 9/00
[52] U.S. Cl. ................................ 380/30; 713/176
[58] Field of Search ................ 380/21, 30; 713/176

[56] References Cited

U.S. PATENT DOCUMENTS

| | | | |
|---|---|---|---|
| 4,868,877 | 9/1989 | Fischer | 380/30 |
| 5,208,858 | 5/1993 | Vollert et al. | 380/43 |
| 5,282,249 | 1/1994 | Cohen et al. | 380/30 |
| 5,724,424 | 3/1998 | Gifford | 380/30 |
| 5,754,659 | 5/1998 | Sprunk et al. | 380/30 |
| 5,790,677 | 8/1998 | Fox et al. | 380/21 |
| 5,999,626 | 12/1999 | Mullin et al. | 380/30 |

FOREIGN PATENT DOCUMENTS

| | | |
|---|---|---|
| 0 214 609 | 3/1987 | European Pat. Off. . |
| 0 639 907 | 2/1995 | European Pat. Off. . |

OTHER PUBLICATIONS

Patents Act 1977 Search Report Under Section 17 dated Aug. 13, 1997 (1 page).

*Primary Examiner*—Salvatore Cangialosi
*Attorney, Agent, or Firm*—Finnegan, Henderson, Farabow, Garrett & Dunner, L.L.P.

[57] ABSTRACT

This invention discloses a method of authenticating a signature of a message m comprising the steps of determining a hash h(m) of the message by application of a hash function and deriving therefrom a first signature component. The signor then computes a function mathematically related to the hash of the message and applies the function to the message to obtain a second signature component, bound to the signatory. The signature components are forwarded to a recipient. The recipient then recovers from one of the signature components a message m' and computing a value of m' by applying the hash function, and determining if the value of m' and the hash h(m) embodied in the first signature component are identical whereby identity indicates an authentic signature of the message.

9 Claims, 1 Drawing Sheet

DIGITAL SIGNATURE PROTOCOL WITH REDUCED BANDWIDTH

A digital signature is a piece of information which binds the creator to a message. Digital signature algorithms (or signature creation) are methods to construct a signature. Verification algorithms are methods to check or verify the authenticity of a signature. A digital signature scheme or mechanism consists of a signature creation algorithm and a signature verification algorithm. If the verification algorithm requires the message as an input, the digital signature is called a digital signature with appendix. If it does not require the message, it is called a digital signature with message recovery.

The most well known example of a digital signature scheme comes from the RSA public-key cryptosystem. This gives a digital signature with message recovery. Nyberg and Rueppel recently have shown that the class of digital signatures commonly referred to as El Gamal-like scheme can be modified to give the message recovery property.

One of the drawbacks to all of the known digital signature schemes with message recovery is that the message must contain sufficient redundancy to avoid an existential forgery attack For example, ISO/IEC 9796 is an international standard whose purpose is to prescribe how messages should be formed before being signed by the RSA technique. It allows at most half of the bits in the messages to be information bits; the rest are reserved for redundancy. Accordingly, an increased bandwidth is required to process the messages.

It is an object of the present invention to provide a signature scheme in which the required redundancy is reduced.

In general terms, the present invention provides a signature component for a message which utilises a hash of the message. The message is mathematically combined with the private key of the signatory and so it can be recovered using the public key of the signatory. The recipient receives the hash of message and can compare it to the corresponding hash of the recovered message to authenticate the signature.

More particularly, the present invention provides a method of authenticating a signature of a message m comprising the steps of (i) determining a hash h(m) of said message by application of a hash function and deriving therefrom a first signature component.

(ii) computing a function mathematically related to said hash of said message;

(iii) applying said function to said message to obtain a second signature component, bound to said signatory;

(iv) forwarding to a recipient said signature components;

(v) recovering from said second component a message m';

(vi) computing a hash value of m' by applying said hash function; and (vii) determining if said hash value of m' and said hash h(m) embodied in said first signature component are identical whereby identity indicates an authentic signature of said message.

Such new classes of digital signatures provide message recovery and having the novel feature that minimal redundancy is required in the message to be signed. The bandwidth saving could be very useful in some situations. For example, for a trusted third party (TTP) who creates certificates for entities in a network, bandwidth requirements are a concern. A TTP using a RSA scheme with modulus size 1024 bits to sign messages in the order of 1000 bits will require a bandwidth in excess of 2000 bits. One embodiment described below gives a scheme which would require only a small number of bits in excess of this message size.

Embodiments of the invention will now be described by way of example only with reference to the accompanying drawings, in which FIGURE is a schematic representation of a data communication system.

Referring therefore to FIG. 1, a pair of correspondents, 10,12, denoted as correspondent A and correspondent B, exchange information over a communication channel 14 A cryptographic unit 16,18, is interposed between each of the correspondents 10,12 and the channel 14. Each of the cryptographic units 16,18 can take a message carried between each unit 16,18 and its respective correspondent 10,12 and generate a signature associated with the message and the correspondent to be carried on the channel 14. The signature may be generated in a number of ways depending on the underlying cryptographic principles utilised.

1. Methods Based on Integer Factorization

Let p and q be prime numbers and n=pq such that the integer factorzation problem for n is intractable. The method to be described requires a one-way cryptographic hash function h which maps bit strings of arbitrary length to bit string of length t. Typically t will be 64 or 128 bits. The message to be signed may be thought of as integers in $Z_n$.

Algorithm 1. Signature Generation.

Let Entity A have the public-key n and the private key $\lambda(n)=1$ cm(p−1, q−1). To sign a message $m \epsilon Z_n^*$ entity A does the following:

(a) Treat m as a bit string and compute the hash value $e_m$=h(m).

(b) Use the extended Euclidean algorithm to compute an integer $d_m$ such that $d_m e_m = 1 \pmod{\lambda(n)}$, where the bit string $e_m$ is now considered to be the binary representation of an integer.

(c) Compute $s_m = m^{d_{em}} \pmod{n}$.

(d) The signature for message m is ($s_m$, $e_m$).

Algorithm 2. Signature Verification.

An entity B can verify the signature ($s_m$, $e_m$) by doing the following:

(a) Looks up entity A's public key n.

(b) Computes $m' = s_m^{e_m} \pmod{n}$ (c) Verifies that $h(m') = e_m$.

(d) If the verification process in (c) is successful, then m' is the recovered message.

For the signature algorithm to work, it must be true that the gcd ($e_m$, $\lambda(n)$)=1. This can be guaranteed by the following simple modification. Let c be a string of l bits. Instead of using h(m), use $e_m$=h(m)||c where || means concatenation and c is chosen so that the integer represented by $e_m$ is relatively prime to $\lambda(n)$ (ie. gcd ($e_m$,$\lambda(n)$)=1). A preferred way to do this would be to select the primes p and q so that p−1 and q−1 have no small odd prime factors and c is selected as bit 1 (i.e. l=1). It then follows that $e_m$=h(m)||c is odd and that the probability that gcd ($e_{m,\lambda}(n)$)=1 is very high. For the verification algorithm in step (c), instead of verifying that if $h(m')=e_m$,) B verifies that h(m') is equal to the first t bits of the $e_m$.

The signature for message m contains (t+log$_2$n) bits or (t+l+log$_2$n) bits if one uses the modification described above.

The signature mechanism does not have the homomorphism property that RSA signature has. Since when two messages m and m' have the same hash value, the product of m and m' may not have the same hash value. Thus existential forgery by multiplying signatures will not work in general, since the probability that h(m)=h(m')=h(mm') is small.

The probability that an adversary can guess a pair $(s_m, e_m)$ which will be a signature of some m is $½^t$. Signature generation for the new method is only slightly more work (application of the Euclidean algorithm and the hash function) than for an RSA signature generation on the same modulus. Signature verification is more work (but not significantly more) than an RSA verification provided the RSA public exponent is small; otherwise, the new method is superior.

A further modification of the integer factorization scheme is a modification of the RSA signature scheme. Let Entity A have the public key n, e and the private key d where ed≡1 (mod n).

Algorithm 3. Signature Generation.

To sign a message m, the entity A should do the following:

(a) Treat m as a bit string and compute the hash value h(m) where h(m) can be any one way function.

(b) Compute $s_m = (mh(m))^d \pmod{n}$.

(c) The signature for message m is $(s_m, h(m))$.

Algorithm 4. Signature Verification.

An entity B can verify the signature $(s_m, h(m))$ by doing the following:

(a) Looks up entity A's public key e, n.

(b) Computes $m' = s_m^{e_m} (h(m))^{-1} \pmod{n}$.

(c) Verifies that h(m')=h(m).

(d) If the verification process in (c) is successful, then m' is the recovered message.

2. Methods Based on Rabin Signature Scheme

An alternative signature scheme is that known as Rabin which gets its security from the difficulty of finding square roots, modulo a composite number.

Let n=pq be a product of two primes were p≡3 (mod 8) and q≡7 (mod 8).

$$t = \frac{1}{2}\text{lcm}\{p-1, q-1\} = \frac{(p-1)(q-1)}{4}.$$

It is easy to show that $m^t=1 \pmod n$, provided m is a quadratic residue modulo n and $m^t=-1 \pmod n$, provided m is a quadratic non-residue modulo p and modulo q respectively. Let $J_m = (m/n)$ be the Jacobi symbol $Q_n$ be the set of quadratic residues modulo n, and m is invertable mod n and we have the following facts:

if $J_m = 1$, then $m^t \equiv$  1 (mod $n$) if $m \in Q_n$   Fact 1
 −1 (mod $n$) if $m \notin Q_n$.

if $J_m = -1$, then $J_{\frac{m}{2}} = 1$.   Fact 2

Fact 3. let e be even and d satisfy that ed≡1 (mod t). If $J_m=1$, then $m^{ed} \equiv$  $m$(mod $n$) if $m \in Qn$
 $-m$(mod $n$) if $\notin Qn$.

Fact 1 and Fact 2 are trivial. For Fact 3, we can find an odd integer x such that ed=1+xt. Hence, $$m^{ed} = m^{1+xt} = (m^t)^x m \equiv \quad 1 - m(\text{mod } n) \text{ if } m \in Qn$$

$$(-1)^x m(\text{mod } n) \text{ if } m \notin Qn.$$

Algorithm 5. Signature Generation for Modified Rabin Scheme.

Let Entity A have the public-key n and the private key t. To sign a message $$m < \left\lfloor \frac{n-2}{8} \right\rfloor,$$

entity A should do the following:

(a) Treat m as a bit string and compute the hash value h(m); then set $e_m=4h(m)+2$.

(b) Use the extended Euclidean algorithm to compute an integer $d_m$ such that $d_m e_m=1 \pmod t$, where the bit string $e_m$ is now considered to be the binary representation of an integer.

(c) Compute $$J_{8m+2} = \left(\frac{8m+2}{n}\right)$$

and set an integer M by following rule:

M=8m+2 if $J_{8m+2}=1$.

M=4m+1 if $J_{8m+2}=-1$.

(d) Compute $s_m = M^{d_m} \pmod n$.

(e) The signature for message m is $(s_m, e_m)$.

Algorithm 6. Signature Verification for Proposed Rabin Scheme.

An entity B can verify the signature $(s_m, e_m)$ by doing the following:

(a) Looks up entity A's public key n.

(b) Computes $M' = s_m^{e_m} \pmod n$, where 0<M'<n.

(c) Takes m' by following rule:

$$m' = \frac{M'-2}{8}, \text{ if } M' \equiv 2 \pmod 4.$$

$$m' = \frac{n-M'-2}{8}, \text{ if } M' \equiv 3 \pmod 4.$$

$$m' = \frac{M'-1}{4}, \text{ if } M' \equiv 1 \pmod 4.$$

$$m' = \frac{n-M'-1}{4}, \text{ if } M' \equiv 0 \pmod 4.$$

(d) Computes h(m') and verifies that $4h(m')+2=e_m$.

(e) If the verification process in (d) is successful then m' is the recovered message 3. Methods Based on Discrete Log Problem A further class of signature schemes is based on the intractability of the discrete log problem of which the Nyberg-Rueppel method is an example.

As with the RSA scheme, the Nyberg-Rueppel method of digital signature suffers the drawback that message redundancy is required. The method described below overcomes this problem.

For the sake of simplicity only, one of the various possibilities will be discussed in detail, and although the method is applicable to any finite group, it will only be described in $Z_p^*$.

Let p and q be primes such that p|q−1 and the discrete logarithm problem is intractable in $Z_p^*$. Let α be a generator for the cyclic subgroup G of order q in $Z_p^*$ and let h be a cryptographic hash function as described above.

Entity A selects a private key a which is an integer selected at random from {1,2, . . . , q−1} and computes the public key $\beta = \alpha^a$.

Algorithm 7. Signature Generation.

To sign a message m∈Zp, entity A should do the following:

(a) Compute h(m).

(b) Select a random integer k∈{1,2, . . . q−1}.

(c) Compute $r = m\alpha^k$ (mod p).

(d) Compute $s_m = arh(m) + k$ mod q.

(e) The signature for message m is $(s_m, r, h(m))$.

Algorithm 8. Signature verification.

Entity B can verify the signature $(s_m, r, h(m))$ on m by doing the following:

(a) Looks up A's public key β.

(b) Computes $v_1 = \alpha^{s_m}$ (mod p)

(c) Computes $v_2 = \beta^{-rh(m)}$ (mod p).

(d) Computes $w = v_1 v_2$ (mod p).

(e) Computes $m' = rw^{-1}$ (mod p).

(f) Computes h(m') and verifies that h(m')=h(m).

(g) The recovered message is m'.

Signature generation using the method of algorithm 7 and 8 is almost as efficient as the original Nyberg-Rueppel scheme except for the computation of the hash function.

Similarly, signature verification is almost as efficient as original Nyberg-Rueppel scheme except for the computation of the product rh(m) mod q and the computation of the hash value h(m').

The Nyberg-Rueppel scheme can not be simply modified to give the same results. For example, sending the hash of the message does not preclude an existential forgery attack. Other Nyberg-Rueppel like schemes can be similarly modified in accordance with the methods of this invention. Alternatively, the methods of the present invention may also be applied to elliptic curves, for example, a Nyberg-Rueppel scheme that mall be applied to elliptic curves is described below.

Let the curve be $y^2 + xy = x^3 + ax^2 + b$ with large-prime order n and P be a point on the curve having x and y coordinates. Also let h be a cryptographic hash function as described earlier.

Algorithm 9. Signature Generation

Entity A selects a private key d which is an integer selected at random over {1, 2, . . . n−1} and computes the public key Q=dP. To sign a message m where 1<m<n, entity A should do the following:

(a) Compute h(m).

(b) Select a random integer k∈{1,2, . . . n−1}.

(c) Compute kP and take x as the x-coordinate of the point kP.

(d) Compute r = m+x (mod n).

(e) Compute $s_m = drh(m) + k$ mod n.

(f) The signature for the message is $(s_m, r, h(m))$.

Algorithm 10. Signature Verification

Entity B can verify the signature $(s_m, r, h(m))$ on m by doing the following:

(a) Look-up A's public key Q.

(b) Compute $s_m P$.

(c) Compute $(-rh(m))Q$.

(d) Compute $T = s_m P + (-rh(m))Q$ and take x' as the x-coordinate of the point.

(e) Compute m' = r−x' (mod n).

(f) Compute h(m') and verify that h(m')=h(m).

(g) The recovered message is m'.

While the invention has been described in connection with a specific embodiment thereof and in a specific use, various modifications thereof will occur to those skilled in the art without departing from the spirit of the invention.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims.

We claim:

1. A method of authenticating a signature of a message m comprising the steps of:

a) determining a representation h(m) of said message by application of a one-way function and deriving therefrom a first signature component, b) computing a function mathematically related to said representation h(m) of said message, c) applying said function to said message to obtain a second signature component, bound to said signatory, d) forwarding to a recipient said signature components, e) recovering from said second component a message m', f) computing a value of m' by applying said one-way function, and g) determining if said value of m' and said representation h(m) embodied in said first signature component are identical whereby identity indicates an authentic signature of said message.

2. A method as defined in claim 1, said one-way function being a crytographic hash function.

3. A method as defined in claim 2, said hash function being a SHA-1 hash function.

4. A method of authenticating a signature of a message in comprising the steps of:

a) determining a hash h(m) of said message by application of a hash function and deriving therefrom a first signature component $e_m$, b) computing a function $d_m$ mathematically related to said hash of said message such that $e_m d_m = 1 \mod(\lambda(n))$, c) applying said function $d_m$ to said message to obtain a second signature component $S_m$, bound to said signatory such that $S_m = m^{d_m} \mod(\lambda(n))$, d) forwarding to a recipient said signature components $(e_m, S_m)$, e) recovering from said second component $S_m$ a message m' where $S_m^{e_m} = m'$, f) computing a hash value of m' by applying said hash function, and g) determining if said hash value of m' and said hash h(m) embodied in said first signature component are identical whereby identity indicates an authentic signature of said message.

5. A method of authenticating a signature of a message m comprising the steps of:

a) determining a hash h(m) of said message by application of a hash function and deriving therefrom a first signature component, b) selecting a random integer $k \in \{1,2, \ldots q-1\}$, c) computing a third signature component r such that $r = m\alpha^k \pmod{p}$, where $\alpha$ is a generator for a cyclic group G of order q in $Z_p^*$ and wherein q divides p−1, d) computing a second signature $s_m$ component mathematically related to said hash h(m) of said message, such that $s_m = arh(m) + k \mod q$, a being a private key of said signatory, e) forwarding to a recipient said signature components, f) recovering from said second and third signature components a message m', g) computing a value of m' by applying said hash function, and h) determining if said value of mn' and said representation h(m) embodied in said first signature component are identical whereby identity indicates an authentic signature of said message.

6. A method of authenticating a signature of a message m comprising the steps of:

a) determining a hash h(m) of said message by application of a hash function and deriving therefrom a first signature component, b) selecting a random integer $k \in \{1,2, \ldots q-1\}$, c) computing a third signature component r such that $r = m + x \pmod{n}$, where x is a coordinate of a point kP on an elliptic curve defined by $i^2 + xy = x^3 + ax^2 + b$ of order n, i) computing a second signature $s_m$ component mathematically related to said hash h(m) of said message, such that $s_m = drh(m) + k \mod q$, d being a private key of said signatory, j) forwarding to a recipient said signature components, k) recovering from said second and third signature components a message m', l) computing a value of m' by applying said hash function, and m) determining if said value of m' and said representation h(m) embodied in said first signature component are identical whereby identity indicates an authentic signature of said message.

7. A computer readable medium whose contents cause a computer system to generate a signature of a message m, the computer system having a signature generation program, by performing the steps of:

a) determining a representation h(m) of said message by application of a one-way function and deriving therefrom a first signature component, b) computing a function mathematically related to said representation h(m) of said message, c) applying said function to said message to obtain a second signature component, bound to said signatory, d) forwarding to a recipient said signature components, whereby said signature components include said message and a message dependant component.

8. A computer readable medium as defined in claim 7, including a signature verification program.

9. A computer readable medium as defined in claim 8, said signature verification program including the steps of:

a) recovering from said second component a message m', b) computing a value of m' by applying said one-way function, and c) determining if said value of m' and said representation h(m) embodied in said first signature component are identical whereby identity indicates an authentic signature of said message.

* * * * *

UNITED STATES PATENT AND TRADEMARK OFFICE
CERTIFICATE OF CORRECTION

PATENT NO.: 6,097,813

DATED: August 1, 2000

INVENTORS: Scott A. VANSTONE et al.

It is certified that an error appears in the above-identified patent and that said Letters Patent is hereby corrected as shown below:

Claim 4, Column 6, line 45, "message in" should read --message m--.

Claim 5, Column 7, line 18, "mn'" should read --m'--.

Claim 6, Column 7, line 33, "i$^2$+xy" should read --y$^2$+xy--.

Signed and Sealed this

Seventeenth Day of April, 2001

*Attest:*

NICHOLAS P. GODICI

*Attesting Officer*   *Acting Director of the United States Patent and Trademark Office*